(12) United States Patent
Sauthoff et al.

(10) Patent No.: US 12,164,076 B2
(45) Date of Patent: Dec. 10, 2024

(54) EXPANDABLE COIL ANTENNA FOR DOWNHOLE MEASUREMENTS

(71) Applicant: Baker Hughes Oilfield Operations LLC, Houston, TX (US)

(72) Inventors: Bastian Sauthoff, Burgdorf (DE); Alexander Malkov, Hannover (DE); Volker Peters, Niedersachsen (DE)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 28 days.

(21) Appl. No.: 17/979,468

(22) Filed: Nov. 2, 2022

(65) Prior Publication Data

US 2023/0134990 A1    May 4, 2023

Related U.S. Application Data

(60) Provisional application No. 63/274,691, filed on Nov. 2, 2021.

(51) Int. Cl.
*G01V 3/28* (2006.01)
*E21B 17/02* (2006.01)
(Continued)

(52) U.S. Cl.
CPC .............. *G01V 3/28* (2013.01); *E21B 17/028* (2013.01); *E21B 47/13* (2020.05); *G01V 3/30* (2013.01); *G01V 3/32* (2013.01)

(58) Field of Classification Search
CPC ... G01V 3/28; G01V 3/30; G01V 3/32; E21B 17/028; E21B 47/13
See application file for complete search history.

(56) References Cited

U.S. PATENT DOCUMENTS

| | | | |
|---|---|---|---|
| 3,793,608 A * | 2/1974 | Ring | H01R 13/523 439/933 |
| 3,898,731 A * | 8/1975 | Ring | H01R 13/523 29/875 |

(Continued)

OTHER PUBLICATIONS

Anonymous; "Duo-Seel Connectors Kemlon Technical Information"; retrieved from the internet Feb. 2, 2021; http://kemlon.com/catalogs/duoseel/techinfo1/technifo1.html; 4 pp.

(Continued)

*Primary Examiner* — Paresh Patel
(74) *Attorney, Agent, or Firm* — CANTOR COLBURN LLP

(57) ABSTRACT

A downhole electromagnetic device includes an antenna wire placed on or at a tool body, a cavity in the tool body having a cavity pressure smaller than a downhole fluid pressure, and an electronic circuit disposed in the cavity. The antenna wire includes an electrical conductor, and an insulator configured to be exposed to a downhole fluid. The device includes an electrical connector connected to an end of the antenna wire, a sealing element configured to seal the connector from the downhole fluid, the sealing element contacting an inner surface of the connector and an outer surface of the insulator, and a first support member configured to support a load applied on the connector by the antenna wire. The connector provides electrical contact between the antenna wire and the electronic circuit, and the load is caused by a differential pressure defined by the downhole fluid pressure and the cavity pressure.

20 Claims, 7 Drawing Sheets

(51) Int. Cl.
*E21B 47/13* (2012.01)
*G01V 3/30* (2006.01)
*G01V 3/32* (2006.01)

(56) References Cited

U.S. PATENT DOCUMENTS

| | | | |
|---|---|---|---|
| 4,077,261 A * | 3/1978 | Ring | G01L 19/0672 |
| | | | 73/706 |
| 4,319,240 A * | 3/1982 | Stone | E21B 47/24 |
| | | | 340/855.1 |
| 5,212,495 A | 5/1993 | Wink | |
| 7,265,649 B1 | 9/2007 | Hall et al. | |
| 7,436,183 B2 | 10/2008 | Clark | |
| 9,507,045 B2 | 11/2016 | Espinosa et al. | |
| 10,027,013 B2 | 7/2018 | Korovin et al. | |
| 2002/0057210 A1* | 5/2002 | Frey | E21B 47/017 |
| | | | 340/854.3 |
| 2007/0257812 A1* | 11/2007 | Lasater | E21B 47/12 |
| | | | 340/854.8 |
| 2009/0309798 A1* | 12/2009 | Bittar | G01V 3/28 |
| | | | 343/720 |
| 2011/0309949 A1* | 12/2011 | Dopf | E21B 47/13 |
| | | | 340/854.6 |
| 2014/0368198 A1 | 12/2014 | Espinosa et al. | |
| 2019/0196048 A1 | 6/2019 | Ang et al. | |
| 2019/0198966 A1 | 6/2019 | Dang et al. | |
| 2019/0361142 A1 | 11/2019 | Hensarling et al. | |

OTHER PUBLICATIONS

International Search Report and Written Opinion for International Application PCT/US2022/048664; International Filing Date: Nov. 2, 2022; Date of Mailing: Mar. 15, 2023; 7 pages.

\* cited by examiner

EXPANDABLE COIL ANTENNA FOR DOWNHOLE MEASUREMENTS

CROSS REFERENCE TO RELATED APPLICATIONS

This application claims the benefit of an earlier filing date from U.S. Provisional Application Ser. No. 63/274,691 filed Nov. 2, 2021, the disclosure of which is incorporated herein by reference in its entirety.

BACKGROUND

Understanding the characteristics of geologic formations and fluids located therein is important for effective hydrocarbon exploration and production. Formation evaluation relies on accurate petrophysical interpretation derived from a diverse set of logging technologies. Such technologies include electromagnetic measurement systems, such as resistivity and nuclear magnetic resonance (NMR) systems, and data communication systems, which can be used in applications such as wireline logging and logging-while-drilling (LWD). Tools such as NMR and resistivity tools include separate receiving and transmitting antennas, or transceiver antennas capable of both transmission of measurement signal and detection of signals from a sensitive volume.

SUMMARY

An embodiment of a downhole electromagnetic device includes a tool body, an antenna wire placed on or at the tool body and winded to define at least one antenna loop, a cavity in the tool body having a cavity pressure, the cavity pressure being smaller than a downhole fluid pressure, and an electronic circuit disposed in the cavity. The antenna wire includes an electrical conductor, and an insulator having an outer surface, the insulator made from a non-conductive insulating material, the insulator configured to be exposed to a downhole fluid and insulate the electrical conductor from the downhole fluid, the downhole fluid having the downhole fluid pressure. The device also includes an electrical connector connected to an end of the antenna wire, the electrical connector including a longitudinal axis and an inner surface, a sealing element configured to seal the electrical connector from the downhole fluid, the sealing element contacting the inner surface of the electrical connector and the outer surface of the insulator, and a first support member configured to support a load applied on the electrical connector by the antenna wire. The electrical connector provides electrical contact between the antenna wire and the electronic circuit, and the load applied on the electrical connector is caused by a differential pressure defined by the downhole fluid pressure and the cavity pressure.

An embodiment of a method of connecting an antenna to an electronic circuit in a downhole tool includes deploying a tool in a borehole, the tool including a tool body and an antenna wire placed on or at the tool body and winded to define at least one antenna loop, the antenna wire including an electrical conductor and an insulator having an outer surface, the insulator made from a non-conductive insulating material, the insulator configured to be exposed to a downhole fluid having a downhole fluid pressure and insulate the electrical conductor from the downhole fluid, and an electronic circuit disposed in a cavity in the tool body, the cavity having a cavity pressure, the cavity pressure being smaller than the downhole fluid pressure. The method also includes connecting an electrical connector to an end of the antenna wire, the electrical connector including an inner surface and a first support member, sealing with a sealing element the electrical connector from the downhole fluid, the sealing element contacting the inner surface of the electrical connector and the outer surface of the insulator, and supporting with the first support member a load applied on the electrical connector by the antenna wire. The electrical connector provides electrical contact between the antenna wire and the electronic circuit, and the load applied on the electrical connector is caused by a differential pressure defined by the downhole fluid pressure and the cavity pressure.

An embodiment of a connection device for a downhole electromagnetic device includes an electrical connector configured to be connected to an end of an antenna wire, the antenna wire placed on or at the tool body and winded to define at least one antenna loop, the antenna wire including an electrical conductor and an insulator having an outer surface, the insulator made from a non-conductive insulating material, the insulator configured to be exposed to a downhole fluid and insulate the electrical conductor from the downhole fluid, the downhole fluid having a downhole fluid pressure. The connection device also includes an electronic circuit disposed in a cavity in the tool body, the cavity having a cavity pressure, the cavity pressure being smaller than the downhole fluid pressure. The electrical connector is configured to provide electrical contact between the antenna wire and the electronic circuit, and the load applied on the electrical connector is caused by a differential pressure defined by the downhole fluid pressure and the cavity pressure. The electrical connector includes a longitudinal axis and an inner surface, a sealing element configured to seal the electrical connector from the downhole fluid, the sealing element contacting the inner surface of the electrical connector and the outer surface of the insulator, and a first support member configured to support a load applied on the electrical connector by the antenna wire.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
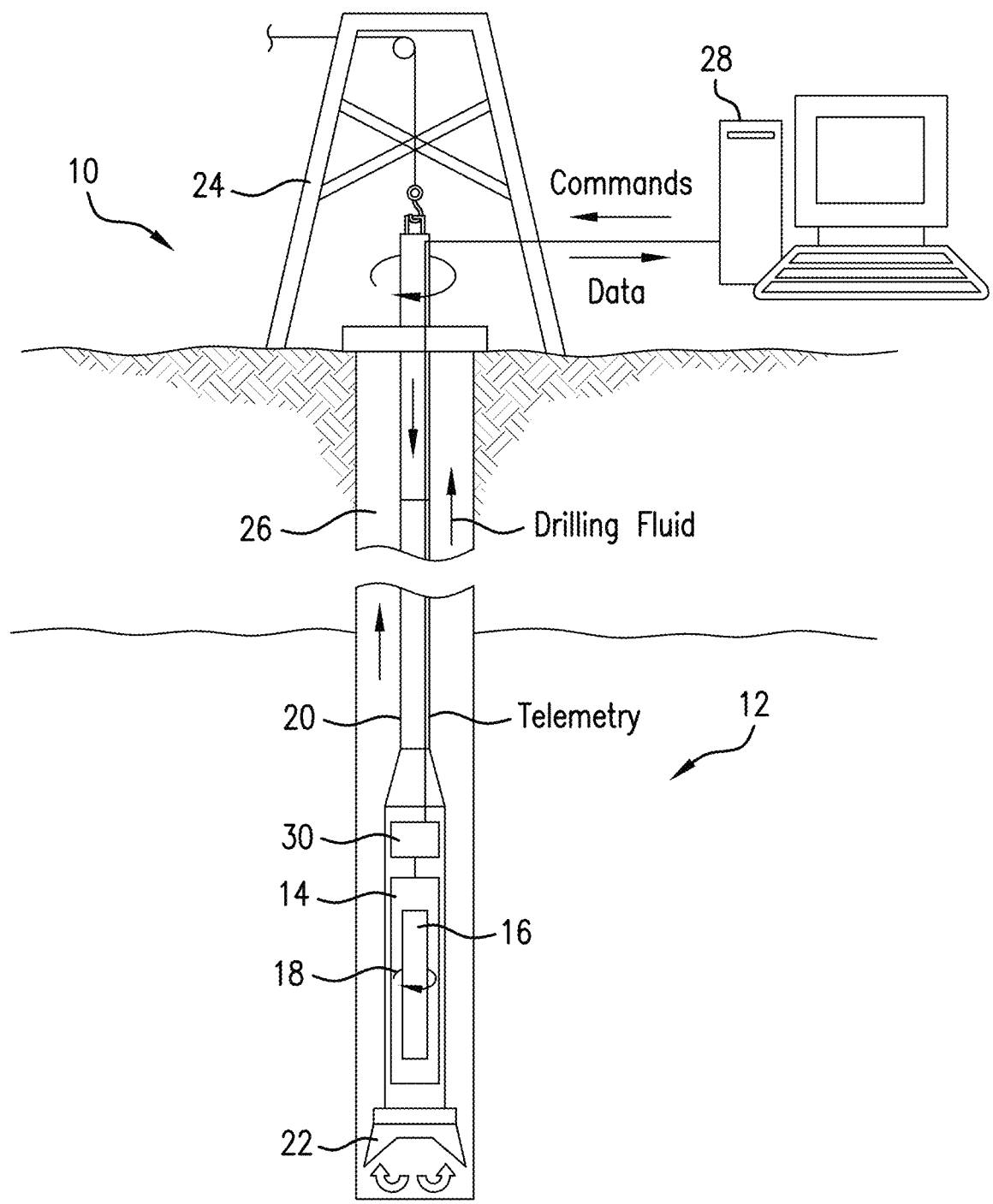
FIG. 1 depicts an embodiment of a measurement system that includes an electromagnetic apparatus, device or tool configured to perform measurements of a subterranean region and/or borehole, and/or configured to communicate data.

Apparatuses and methods for measuring properties of a subterranean region using electromagnetic measurements are described herein. An embodiment of a measurement apparatus, such as a resistivity tool, drilling sub and/or logging-while-drilling (LWD) component, includes one or more antennas for transmitting and/or receiving measurement signals. The measurement apparatus may include components for performing resistivity, nuclear magnetic resonance (NMR) and/or other electromagnetic measurements. The antenna may be configured for other types of transmissions, such as acoustic signals and/or data communications (e.g., short-hop system, electromagnetic telemetry, etc.). The measurement apparatus includes an antenna wire exposed to a downhole fluid and a downhole pressure. The antenna wire connects to electronics (electronic circuit) configured to feed a current into the antenna wire or to receive a signal from the antenna wire. The antenna wire is connected to the electronics through an electrical connector. The connector is connected to the antenna wire by soldering or otherwise electrically connecting a conductor of the antenna wire to a contact element of the connector.

In prior art systems, the contact element is sealed from the downhole fluid by using a sealing system, such as a rubberboot sealing system. The rubberboot sealing system allows pressure compensation between the interior of the connector and the downhole environment, therefore the rubberboot sealing system does not need to be capable of sealing the contact point against high pressures. The differential pressure between the inside and the outside (downhole environment) of the rubber boot is zero. A rubberboot sealing system employs elastic materials such as rubber. These materials tend to degrade under downhole conditions causing reliability problems. Therefore, an alternative system would be beneficial to overcome the limitations of existing downhole antenna connector systems. Embodiments described herein provide solutions to the above limitations.

An embodiment of the measurement apparatus (or other apparatus, component or tool) includes a body or structure (e.g., a mandrel, length of drilling pipe, length of wired pipe, LWD tool body, or other body or structure) that can be deployed downhole. The body or structure may be made from metal such as steel, Titanium Inconel, or other alloys. The measurement apparatus also includes an antenna that is disposed at or proximate to the body. The antenna may be disposed or wrapped around the body, or disposed according to another configuration. In an embodiment, the antenna includes one or more coils that extend circumferentially around the body. In other embodiments, the antenna and/or coil(s) are mounted on or in the body, e.g., on one or more support structures. For example, an antenna may surround and be supported by a ferrite module or other structure. The antenna also includes one or more ends that may be configured to be connected to another component, such as a cable or electronics.

The antenna may be flexible and may be configured to be expanded by deforming the antenna to increase the size or inner diameter of the coil(s) in order to, for example, dispose the antenna at the body and/or remove the antenna. In an embodiment, the antenna is expanded by applying opposing forces, which may be perpendicular to a longitudinal axis of the body, or partially perpendicular (e.g., at an angle). The flexibility of the coil(s) is such that release of the opposing forces causes the antenna to return to an initial size or diameter.

The measurement apparatus may include a connection assembly (also referred to as an electrical connector) configured to electrically connect the antenna to electronics disposed within an isolated region of the apparatus, or to another downhole component. The isolated region may be a cavity or housing that is maintained at a reduced or minimal pressure to protect electronics and other sensitive components. The isolated region may also protect electronics from a downhole environment. Conditions of the downhole environment typically include high temperatures and pressures, as well as fluids such as drilling mud, chemicals and/or formation fluids (e.g., produced oil and water). The connection assembly is configured to prevent extrusion of an end of the antenna into the isolated region. The connection assembly includes a sealing system that seals an interior of the connection assembly and an interior of the isolated region from the drilling mud and/or other fluid(s). The sealing system includes a sealing element that provides a fluid and pressure barrier to the interior of the connection assembly by contacting an outer surface of the antenna wire and an inner surface of the connection assembly.

It will be understood that the antenna may have any number of coils, and any number of windings making up a coil. It is also noted that embodiments described herein are not limited to the specific shape, size and configuration of the coils and various components of the antenna and/or measurement assembly.

FIG. 1 illustrates an embodiment of a downhole drilling, measurement, data acquisition, and/or analysis system 10 that includes devices or systems for in-situ measurement of characteristics of a subterranean region, such as an earth formation 12. The system 10 includes a measurement apparatus such as a measurement tool 14 configured to perform electromagnetic measurements (e.g., resistivity nuclear magnetic resonance (NMR)). In this embodiment, the measurement apparatus 14 is part of a logging-while-drilling (LWD) sub or assembly, but is not so limited.

An exemplary tool 14 includes a magnetic field source 16, such as one or more permanent magnets, and an antenna 18 for transmitting and/or receiving electromagnetic signals. The tool 14 may further include ferrites. A single antenna 18 may be used as a transceiver for both transmitting and receiving signals, or there may be separate transmit and receive antennas 18.

The tool 14 may be configured as a component of various subterranean systems, such as wireline well logging and LWD systems. For example, the tool 14 can be incorporated within a drill string 20 including a drill bit 22 or other suitable carrier and deployed downhole, e.g., from a drilling rig 24 into a borehole 26 during a drilling operation. The tool 14 is not limited to the embodiments described herein, and may be deployed in conjunction with any downhole component or string component, such as casing pipe, wireline, wireline sondes, downhole subs and bottom-hole assemblies (BHAs).

In one embodiment, the tool 14 and/or other downhole components are equipped with transmission equipment to communicate ultimately to a surface processing unit 28. Such transmission equipment may take any desired form, and different transmission media and methods may be used, such as wired, fiber optic, and/or wireless transmission methods (e.g., mud pulse telemetry, electromagnetic telemetry, etc.). Additional processing units may be deployed with the drill string 20 and/or the LWD system. For example, a downhole electronics unit 30 includes various electronic components to facilitate receiving signals and collect data, controlling antennas, effecting impedance control, transmitting data electromagnetic signals and commands, and/or processing data downhole. The surface processing unit 28, electronics 30, the tool 14, and/or other components of the system 10 include devices as necessary to provide for storing and/or processing data collected from the tool 14 and other components of the system 10. Exemplary devices include, without limitation, at least one processor, storage, memory, input devices, output devices, and the like.

Figure 2:
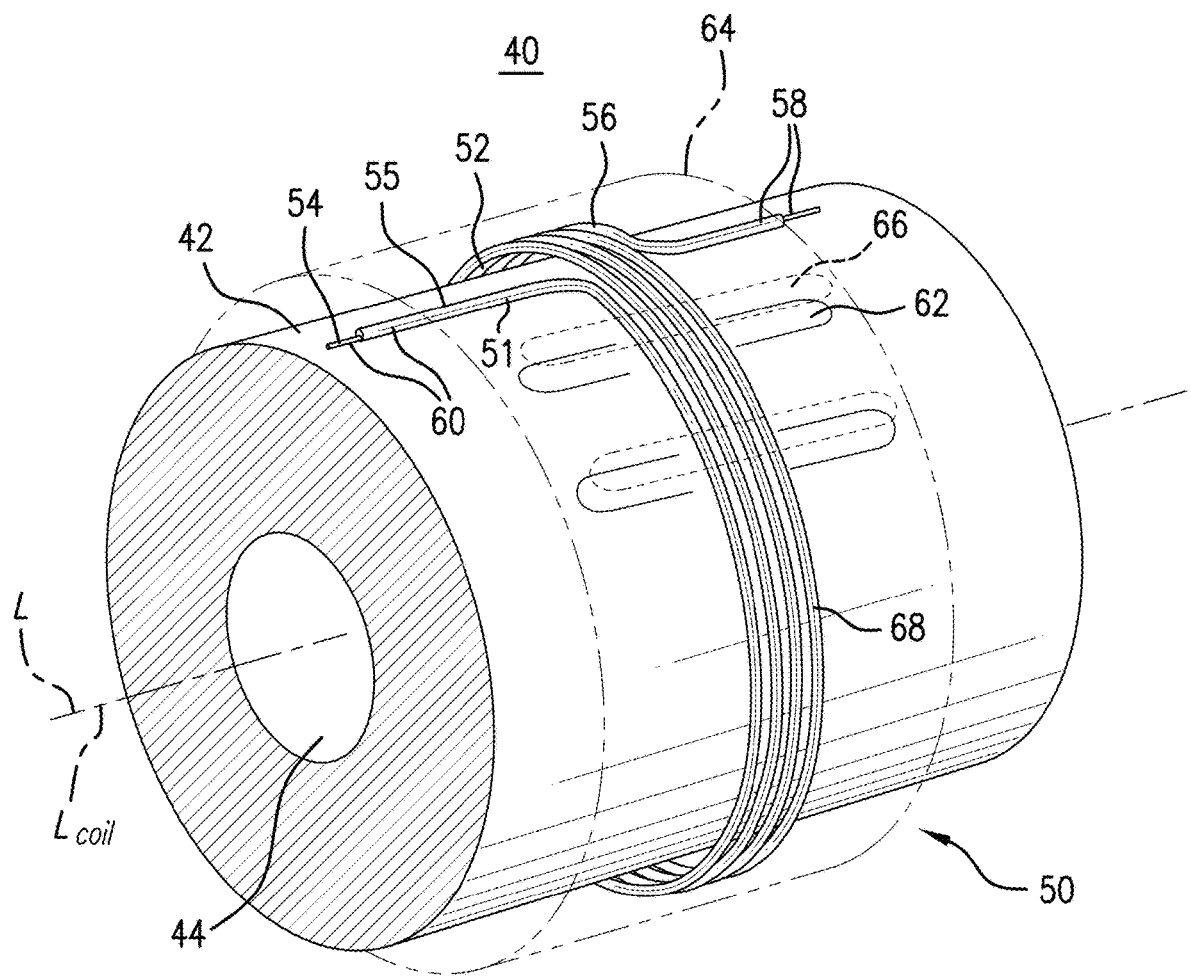
FIG. 2 depicts an embodiment of an electromagnetic measurement apparatus including an expandable antenna having one or more flexible and resilient coils.

FIG. 2 depicts an embodiment of an apparatus 40, which can be deployed in a borehole in a subterranean region. The apparatus 40, in an embodiment, is configured to perform electromagnetic measurements or to transmit data. For example, the apparatus 40 is part of a resistivity tool configured to measure formation resistivity. The apparatus 40 may be part of a LWD tool (e.g., as the tool 14), or may be part of a wireline tool or any other suitable type of tool. The resistivity tool includes at least one transmitter antenna and one receiver antenna. The transmitter antenna is configured to transmit an electromagnetic signal and the receiver antenna is configured to receive an electromagnetic signal.

The apparatus 40 includes a tool body 42, such as a mandrel, pipe segment or other elongated structure, having a longitudinal axis L. The body 42 may be part of a rotating component, such as a LWD or drilling sub, and have an axis L that corresponds to or is parallel to an axis of rotation of the component. The body 42 has a fluid conduit or inner bore 44 for allowing flow of drilling mud, formation fluids and other fluids.

The apparatus 40 also includes at least one antenna 50 that includes a coil that is wrapped or otherwise disposed around an exterior of the body 42. The coil may have any desired number of windings or loops. It is noted that the configuration of the antenna 50 is not limited to the embodiments described herein, as there may be any number of coils in the antenna 50. In addition, the apparatus 40 may have multiple antennas 50 at the body 42 and/or at other locations of a borehole string. Furthermore, although the antenna 50 is shown as being disposed around an exterior of the body 42, the antenna 50 may be deployed in other configurations, such as in an interior of the body 42, or within a cavity, recess, groove, or pocket closed by a lid.

The antenna 50 includes an antenna wire 51 that forms a coil 52 having a coil diameter. The antenna wire 51 may include one or more conductors. In an embodiment, the antenna wire 51 includes an electrical conductor 54 surrounded by an insulating material (insulator) 56. The insulator 56 includes an outer surface 55. As discussed further below, the insulator 56 is made from a rigid, hard and electrically non-conductive material that has a limited flexibility (Young's Modulus) and can be deformed elastically. The insulating material is selected to maintain its rigid and hard material properties at elevated temperatures (e.g., up to 300 degrees Celsius) and is resilient (hardness) with respect to impact forces and pressure loads. The insulating material is resistant to chemical degradation due to chemicals included in a downhole fluid. The conductor 54 is formed, for example, from a solid wire or from a litz wire.

Based on the material properties of the insulator 56 and the conductor 54, the antenna wire 51 may maintain the shape given during a manufacturing process, such as a coiled shape. The geometry and the material properties of the insulator 56 allow the antenna coil 52 to be deformed from an initial size or coil diameter by applying a force, and return to the initial size or coil diameter, at least substantially, when removing the force. The antenna wire 51 has a spring constant defined by the material properties of the insulating material, the geometry of the insulating material, the material properties of the conductor material, and the geometry of the conductor 54. In an embodiment, the insulator 56 has an outer surface (smooth, rigid, hard) configured to be used as a sealing surface for the sealing system of the connection assembly. The outer surface of the insulator 56 is configured to carry the radial forces applied to the insulator 56 by the sealing system. The sealing system is configured to seal the interior of the connection assembly from downhole fluid and downhole pressure. Common wire insulating materials are not configured to provide an outer surface capable of supporting the radial forces of a sealing system required for isolating the interior of the connection assembly from fluid under downhole pressure (e.g., 2000 bar).

Examples of suitable insulating materials include various polymers, including plastic, thermoplastic polymers such as Polyether ether ketone (PEEK), hard plastics such as Polytetrafluoroethylene (PTFE), ceramic materials, and fiber (carbon, glass) reinforced plastic materials (e.g. fiber reinforced PEEK). The material for the conductor 54 may be copper, silver, gold, aluminum or any other suitable conductive material. In an embodiment, the conductor 54 may be formed from an electrically conductive powder, or liquid. In case of a powder or liquid conductor material, the insulating material ensures confinement of the conductor material within the antenna coil 52.

The antenna wire 51 is manufactured to achieve a direct connection between the conductor 54 and the insulator 56 without cavities between the conductor 54 and the insulator 56. A cavity (e.g., filled with air or any other gas) can lead to damage of the insulator 56 at the location of the cavity along the length of the antenna wire 51 due to the high downhole pressure loads acting on the outer surface of the insulator 56. Varies manufacturing methods may be employed to mantle the conductor 54 of the antenna wire 51 with a rigid insulator material having material properties required to provide an adequate sealing surface on the outside of the insulator 56. A manufacturing method that can be used to achieve a hermetic seal of the conductor 54 of the antenna wire 51 may be a heat shrink technology. The heat shrink technology applies the insulator 56 directly and fixedly connected to an outer surface of the conductor 54. "Directly applied and fixedly connected" refers to the insulator 56 being mounted on the electrical conductor 54, such that the conductor 54 cannot be separated from the insulator 56 without damaging or destroying the antenna wire 51. Alternative manufacturing methods may include thermofixation, extrusion, or baking technologies. In many of these manufacturing methods, the insulator material is applied on the conductor 54 by using heat and pressure, resulting in the antenna wire 51 forming an integral unit of the insulator 56 and the electrical conductor 54.

In an alternative manufacturing method, a tube made from the rigid insulator material may be filled with Epoxy to replace the air in the tube. In a subsequent step, the conductor 54 may be led through the Epoxy filled insulator tube before hardening of the Epoxy. A valid variation of the method may be first leading the conductor 54 through the rigid insulator tube and then filling the clearance between the conductor 54 and the insulator tube with the Epoxy.

The antenna wire or the antenna coil may be manufactured employing an additive manufacturing technique (3D printing) using multiple materials (including electrically conductive and electrically non-conductive).

The conductor 54 of the antenna wire 51 may be electrically isolated by more than one insulator material, where the outermost insulator material is a rigid and hard insulator material, such as PEEK, providing a sealing surface. The hermetically sealing insulator material (no cavities) may by applied along at least 95% of the length of the antenna wire 51. In an alternative embodiment, the hermetically sealing insulator material is applied along at least 90% of the length of the antenna wire. In yet another embodiment, the hermetically sealing insulator material is applied along at least 80% of the length of the antenna wire 51.

The conductor 54 may have a diameter of 1 mm and the insulator 56 may have a thickness (radial width) of around 0.5 mm, resulting in an antenna wire of 2 mm in outer diameter. In an alternative configuration, the conductor 54 may be smaller in diameter than 1 mm or bigger than 1 mm, and the thickness of insulator 56 may be smaller than 0.5 mm or bigger than 0.5 mm, and all combinations thereof.

The geometry and the material properties of the insulator material and the conductor material allow the antenna 50 to be temporarily deformed to increase the diameter of the antenna 50 to allow the antenna 50 to be easily disposed on the body 42 and/or removed from the body 42. The antenna has a first end 58 and a second end 60, which may be electrically connected to a control circuit, electronics (electrical circuit) or other device. Due to the rigidity of the insulator material, the coiled shape of the antenna wire 51 is not formed by winding the antenna wire 51 around the body 42. Instead, the coiled shape of the antenna coil is achieved before the antenna wire 51 is mounted on the body 42, for example, during a process of manufacturing the antenna wire 51 or in a dedicated coil forming step using higher temperatures.

The antenna coil 52 may be configured so that it extends circumferentially and perpendicular to the axis L, as shown in FIG. 2. Alternatively, the coil 52 may extend circumferentially but at any desired angle (e.g., between zero and 90 degrees) relative to the axis L. In an embodiment, the antenna coil 52 has a central axis $L_{coil}$ parallel to the longitudinal axis L of the body 42.

In an alternative embodiment, the antenna coil 52 does not surround the body 42, and may form concentric loops on the outer surface of the body 42. Such an antenna may not have a central axis $L_{coil}$ parallel to the longitudinal axis L of the body 42. Instead, the concentric loops have a central axis perpendicular to the longitudinal axis L of the body 42, or a central axis having any other angle between 0 degrees and 90 degrees to the longitudinal axis L of the body 42.

In an embodiment, the antenna coil 52 is winded around a dedicated antenna body. The antenna body with the antenna coil 52 winded around it may be placed at any suitable location, such as in a pocket or recess in the outer surface of the body 42. The pocket may be closed by a hatch cover or lid. The central axis of the antenna coil 52 winded around the antenna body may be parallel or perpendicular to longitudinal axis L, or may form any angle with the longitudinal axis L of the body 42.

The measurement apparatus 50 may include other components, such as ferrites 62 or permanent magnets that guide or apply a magnetic field at or around the coil 52. A mechanical shield 64 (shown by dashed lines), such as a sleeve, a shell or a housing, may be included to protect the coils 52 from environmental impacts, e.g., to protect from fluids, solids (drill cuttings) and high downhole pressures. The shield 64 may include openings 66 to allow an electromagnetic field generated by the antenna 50 to pass the shield 64. The openings may be filled with an electrically non-conductive material, such as Epoxy. To protect the ferrites 62, a non-conductive material may be filled into the openings 66 or otherwise disposed to cover the openings 66.

In an embodiment, the antenna 50 defines a spiral winded antenna wire 51 made from the insulator 56 and the conductor 54. The coil 52 may define a single winding 68 or have any number of desired windings 68. The first and second ends may be oriented in the direction of the axis L as shown, or may be oriented along any suitable direction.

Figure 3A:
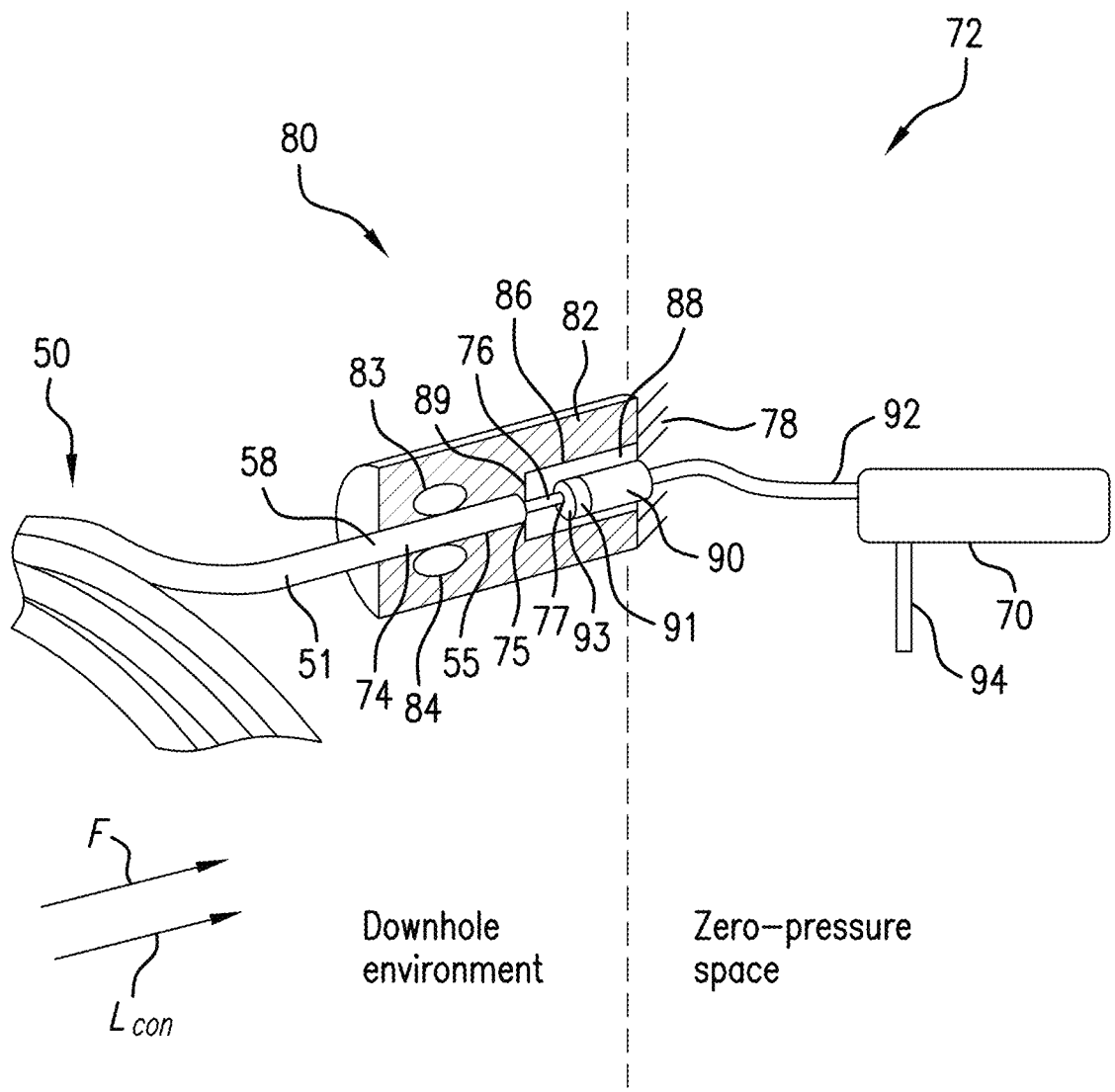
FIGS. 3A and 3B depict embodiments of a connection assembly configured to be connected to the measurement apparatus of FIG. 2.

Referring to FIG. 3A, in an embodiment, the antenna 50 is connected to a connection assembly 80 (also referred to as a connection device) for electrically connecting the antenna 50 to another component. For example, the first end 58 is attached to the connection assembly 80 that connects the antenna 50 to antenna electronics 70, which are disposed in an isolated region 72. The electronics is configured to provide an electronics signal to provide a current to the antenna 50 or to receive a signal from the antenna 50. The isolated region 72 may be a region with a lower pressure than the downhole pressure. The isolated region 72 is referred to as a zero-pressure space, which may be incorporated into the apparatus 40 or disposed at another location on or in the body 42 or other component of a borehole string. The downhole pressure may be greater than 10 bar, greater than 100 bar, greater than 1000 bar, or greater than 2000 bar. The pressure inside the isolated region 72 may be less than 1 bar, may be equal to 1 bar or may be between 1 bar and 10 bar. The isolated region 72 may be a cavity, a recess, or a pocket in the body 42. The isolated region 72 is isolated from the environment of the body 42 by a hatch cover, a lid, a plug, a sleeve, or any other suitable component. The connection assembly 80 comprises a longitudinal axis $L_{con}$. The longitudinal axis $L_{con}$ of the connection assembly 80 may coincide with the longitudinal axis of the portion of the antenna wire located inside the connection assembly (e.g., axis L and/or axis $L_{coil}$).

It is to be understood that the antenna 50 may be connected to the connection assembly 80 at the first end 58 or the second end 60. In addition, there may be a connection assembly 80 connected to each of the first and second ends.

In this embodiment, the connection assembly 80 is attached to a support structure 78 that is fixedly positioned relative to both the apparatus 40 and the isolated region 72. For example, the support structure 78 can be a wall or cover of a recess, a cavity or a pocket of the tool body 42 or an electronics sub. The isolated region 72 protects the electronics 70 from high downhole pressures. As there is a substantial differential pressure between the environment at the apparatus 40 (borehole) and the isolated region 72, the connection assembly 80 is configured to establish a connection that has a sealing to protect the inside of the connection assembly 80 from downhole pressure, mud, fluid and other materials, while also preventing the connected end of the antenna 50 from being extruded into the low pressure isolated region 72. The connected end of the antenna 50 includes an end of the insulator 56 and an end of the conductor 54. The differential pressure between the environment at the apparatus 40 and the isolated region 72 may be greater than 5 bar, 10 bar, 50 bar, 100 bar, 200 bar, 300 bar or 500 bar.

As shown in FIG. 3A, the first end 58 includes an insulated portion 74 that is covered by the insulator 56, and an exposed portion 76 having only the conductor 54 without any electrically insulating material surrounding or covering it. The connection assembly 80 includes a connector housing 82 configured to receive the insulated and exposed portions of the first end 58. The connector housing 82 may be made from metal, plastic, or ceramic material. The housing 82 may be connected to the tool body 42 and is part of the tool body 42, or may be disposed in a recess or a pocket of the tool body 42. The housing 82 includes an inner surface 83. A sealing element 84 (e.g., elastomer, polymer, or rubber) provides a fluid and air-tight seal on the insulated portion 74. The sealing element 84 contacts the outer surface 55 of the insulator of the insulated portion 74 and the inner surface 83 of the housing 82. The housing 82 includes a cavity 86 into which the exposed portion 76 is inserted. The cavity 86 has a lower pressure than the downhole pressure (e.g., 1 bar). A first stop element 88 made from a non-conductive material is included in the cavity 86. The first stop element 88 is also referred to herein as a first support member. The first stop element 88 acts as a stop to prevent extrusion of the insulator of the insulated portion 74 into the cavity 86 and the isolated region 72. The first stop element 88 may encapsulate the exposed portion 76, thereby electrically insulating the exposed portion 76.

In an alternative embodiment, the exposed portion 76 is encapsulated by an encapsulating element (not shown) separate from the first stop element 88. The encapsulating element may be made from any non-conductive material such as a plastic, a ceramic, or a fluid. In an embodiment, at least part of the cavity 86 is filled with a grease. In an embodiment, the grease is non-compressive and may act as an encapsulation element and a stop element at the same time, thereby replacing entirely the first stop element 88.

The housing 82 may be attached to the support structure 78 in any suitable manner (e.g., welding, screwing, gluing, clamping, etc.). Between the housing 82 and the support structure 78 may be a housing sealing structure (not shown) sealing the isolated region 72 from the downhole fluid under downhole pressure. The housing sealing structure may be an elastomer seal, a metal seal or a plastic seal.

The downhole pressure acts on the antenna wire 51 (insulator 56 and conductor 54). The differential pressure between the downhole pressure and the pressure inside the connection assembly 80 and in the isolated region 72 causes a force F (pressure load) to act on the antenna wire 51, pushing the antenna wire 51 towards the cavity 86 and the interior of the isolated region 72. In an embodiment, the pressure inside the connection assembly 80 and inside the isolated region 72 is the same. The coiled shape of the antenna wire 51 leads to a higher force F on the antenna wire 51 compared to an antenna wire that approaches the connection assembly from a direction parallel to the longitudinal axis of the connection assembly 80, due to an increased cross section of the coiled antenna wire that is exposed to the downhole pressure.

The insulated portion 74 includes an insulator support surface 75. The first stop element 88 has a first stop element support surface 89. The insulator support surface 75 contacts the first stop element support surface 89 and supports all or at least a portion of the force F on the antenna wire 51. The insulator support surface 75 and the first stop element support surface 89 have a normal vector each substantially parallel to the direction of the force F. In an alternative embodiment, the normal vector is substantially parallel to the longitudinal axis $L_{con}$ of the connection assembly 80. The normal vector of the insulator support surface 75 and the first stop element support surface 89 may each have a normal vector forming an angle between 0.1 to 10 degrees, 0.1 to 20 degrees, 0.1 to 45 degrees, or 0.1 to 60 degrees to the direction of the force F (or any other suitable angle).

The connection assembly 80 may further include a second stop element 91. The second stop element 91 is also referred to herein as a second support member. The second stop element 91 may coincide with, or be connected to a contact element 90 such as a connector box. The exposed portion 76 of the conductor has a conductor support surface 77, and the second stop element 91 has a second stop element support surface 93. The conductor support surface 77 contacts the second stop element support surface 93 and supports all or at least a portion of the force F applied on the antenna wire 51. The material properties (e.g., rigidness, stiffness, hardness, etc.) of the conductor material allows transfer of all or at least a portion of the force F to the support structure 78 through the second stop element 91. The conductor support surface 77 and the second stop element support surface 93 each have a normal vector substantially parallel to the direction of the force F. The normal vector may be substantially parallel to the longitudinal axis $L_{con}$ of the connection assembly 80. The normal vector of the conductor support surface 77 and the second stop element support surface 93 may each have a normal vector forming an angle between 0.1 to 10 degrees, 0.1 to 20 degrees, 0.1 to 45 degrees, or 0.1 to 60 degrees to the direction of the force F.

The first and second stop element surfaces 89 and 93, and the insulator and conductor support surfaces 75 and 77, each may be a planar surface to ensure full contact of the support surfaces with each other. Both the first stop element 88 and the second stop element 91 may be supported by the support structure 78. Support of the force F at the insulator support surface 75 can only be provided when the material properties of the insulator are suited to support the force acting on the insulator support surface 75. Weak and flexible insulating materials, such as those used with common wires, are not capable of supporting the force F acting on the antenna wire 51. A rigid or stiff and hard material, such as PEEK, allows provision of an insulator support surface 75 strong enough to carry the force F.

The force F acting on the antenna wire 51 depends on the differential pressure between the environment of the apparatus 40 and the isolated region 72 and a cross sectional area of the antenna wire 51 that is exposed to the differential pressure. for example, an antenna wire 51 having an outer diameter of 2 mm applies on the connector a force of around 500 Newtons (N) at an assumed differential pressure of 200 bar. An antenna wire 51 having an outer diameter of 2.5 mm applies on the connector a force of around 700 N at an assumed differential pressure of 200 bar. The diameter of the conductor 54 inside the insulator 56 is, for example, typically 1 mm to 1.5 mm in diameter leading to a radial thickness of the insulator 56 of 0.5 mm. In another example, the radial thickness of the insulator 56 is less than 0.5 mm, such as 0.2 mm to 0.4 mm, or is greater than 0.5 mm, such as 0.6 mm to 0.8 mm. In an extreme scenario of a differential pressure of 2000 bar, the force on the connector applied by the antenna wire 51 is 5000 N and 7000 N for assumed antenna wire outer diameters of 2 mm and 2.5 mm, respectively. The force F acting on the antenna wire 51 is supported by the first support member 88 and the second support member 91.

In an embodiment, support of the force F is split between the first support member 88 and the second support member 91. The split of supported force between the first support member 88 and second support member 91 may be 90% to 10%, or 80% to 20%, or 70% to 30%, or 60% to 40% or 50% to 50% or vice versa (split between second support member and the first support member). In this embodiment, the first support member 88 supports the force applied through the insulator 56, and the second support member 91 supports the force applied through the electrical conductor 51. The split of supported force may be adjusted to avoid compression or stretch in the part of the antenna wire 51 that is located between the first support member 88 and the second support member 91. The amount of force that is carried by the insulator 56 or is transferred from the insulator 56 to the first support member 88 demands an insulator material that is strong enough to not break under the load. Using, for example, PEEK as an insulator material with a tensile strength of at least 90 MPa to 110 MPa at temperatures up to 350 degrees centigrade, permits high load transfers by keeping the radial thickness of the insulator small enough (around 0.5 mm) to preserve sufficient flexibility of the antenna wire 51. The flexibility of the antenna wire 51 allows for increasing the antenna coil diameter by bending the insulator material, and moving the antenna coil over the tool body 42. The connector concept disclosed herein is based on a combination of a geometric limitation (thickness of the insulator material) and strength of the insulator material (tensile strength).

Figure 3B:
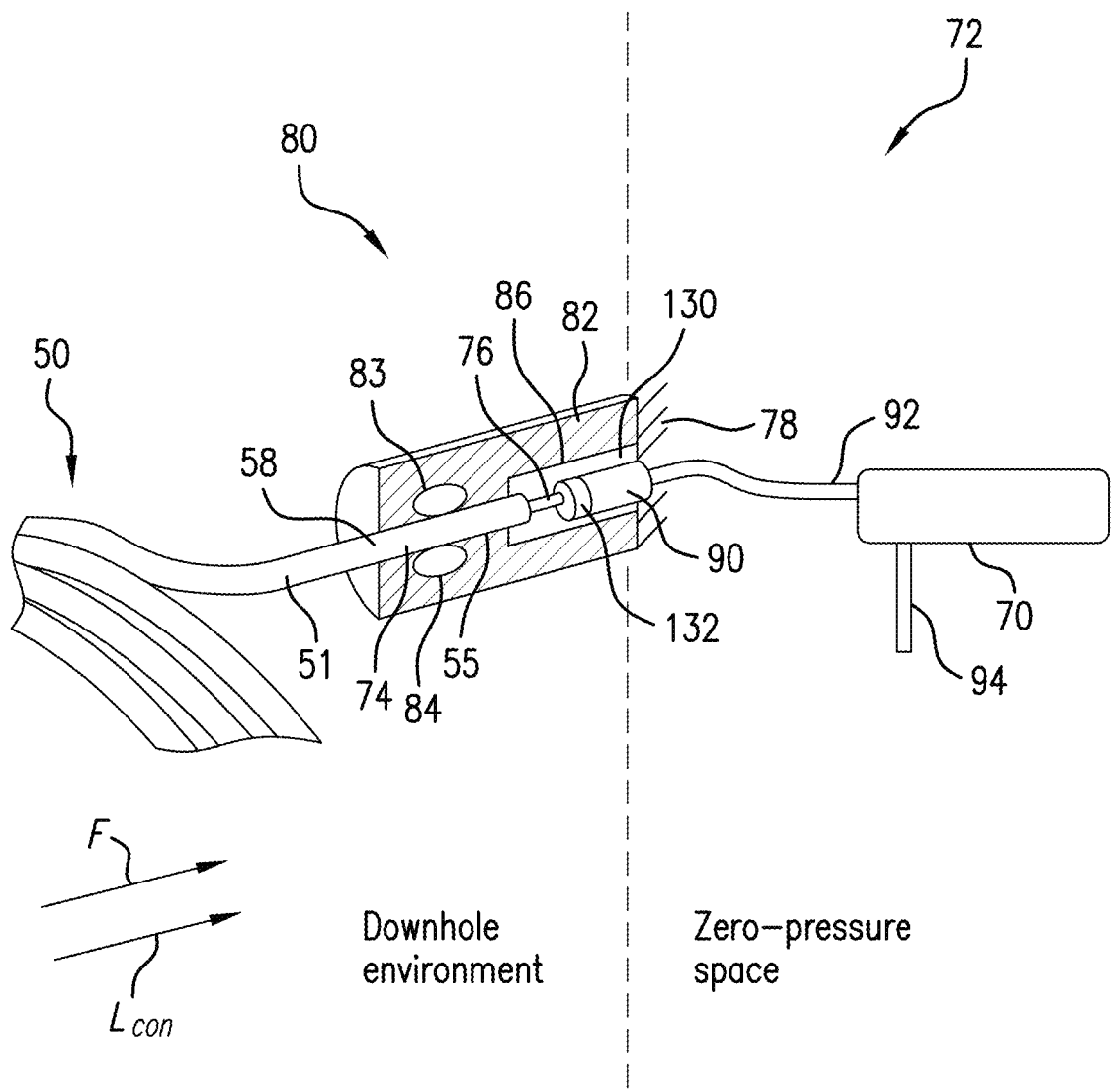

Referring to FIG. 3B, in an alternative embodiment, one or both of the first and second support members (stop element 88 and stop element 91) may be replaced by clamping elements (i.e., clamping members). For example, a first clamping element 130 is supported by the support structure 78. The first clamping element 130 may be fixedly connected to the connection assembly 80. The first clamping element 130 clamps on the outer surface of the insulator in the insulated portion 74 of the antenna wire 51 inside the connection assembly 80. The first clamping element 130 is configured to support all or at least a portion of the force F. The material properties (e.g., rigidness, stiffness, hardness, etc.) of the insulator material allow transfer of all or at least a portion of the force F to the support structure 78 through the first clamping element 130. A second clamping element 132 clamps on the outer surface of the conductor in the exposed portion 76 of the antenna wire 51 inside the connection assembly 80. The second clamping element 132 is supported by the support structure 78. The second clamping element 132 may be fixedly connected to the connection assembly 80. The second clamping element 132 is configured to support all or at least a portion of the force F. The material properties (e.g., rigidness, stiffness, hardness, etc.) of the conductor material allows transfer of all or at least a portion of the force F to the support structure 78 through the second clamping element 132.

Referring to FIGS. 3A and 3B, the sealing element 84 represents the fluid barrier between the downhole environment and the interior of the connection assembly 80 and the isolated region 72. Both may have a pressure significantly smaller than the pressure of the downhole fluid. Typically, the pressure inside the connection assembly 80 and the isolated region 72 is around 1 bar, while the downhole pressure may be 2000 bar. One requirement of a sealing system is to not cause a radial force acting on the insulator 56 of the antenna wire 51 to become too big to damage or destroy the sealing system. This requirement is valid also at downhole temperatures (150 to 300 degrees centigrade). The radial force applied by the sealing system should not vary too much at varying temperatures. Sealing the interior of the connection assembly 80 and the isolated region 72 from the downhole fluid requires sealing surfaces that are rigid and stiff enough to withstand forces (radial forces) applied by the sealing elements onto the sealing surfaces also at downhole conditions such as high temperatures. Further the sealing surfaces need to be manufactured in a way providing a sufficiently smooth surface to allow a sealing member to make tight contact to the sealing surface. The sealing element 84 includes a sealing member making contact between an inner surface of the connection assembly 80, such as an inner surface on the housing 82, and an outer surface of the insulator of the insulated portion 74 of the antenna wire 51 inside the connection assembly 80. The sealing member may be an o-ring as shown in FIGS. 3A and 3B. When the connection assembly 80 is assembled and the antenna wire 51 is placed inside the connection assembly 80, the o-ring is compressed between the outer surface of the insulator or insulated portion 74 and the inner surface of the connection assembly 80, thereby causing a radial force on the insulator of the insulated portion 74 and sealing the inside of the connection assembly 80 from the downhole fluid. The sealing member may be made from an elastomer, a polymer, or rubber. A sealing stack, as known in the art, may be formed from multiple o-rings that are stacked along the longitudinal axis of the insulated portion inside the housing 82. Spacer rings may separate the multiple o-rings in the sealing stack. A sealing frame may be included to keep the o-rings of the sealing stack at a desired position. The sealing frame may be part of the housing 82.

In an alternative embodiment, the sealing element 84 may be a spring energized seal as known in the art. A spring energized seal may include a spring member and multiple support rings stacked along the longitudinal axis of the insulated portion of the antenna wire 51 inside the connection assembly 80. The support rings may be made from metal, a plastic material such as PTFE or PEEK, or elastic materials such as an elastomer or a rubber. The spring element applies a spring tension (spring force) to the support rings that causes the support rings to extend in radial direction or to slightly displace in radial direction, leading to a radial force acting on the outer surface of the insulator of the insulated portion 74 and on the inner surface of the connection assembly 80. The support rings of the spring energized seal may include inclined surfaces. Inclined refers to a direction diverting from a direction perpendicular to the longitudinal axis of insulated portion 74. The radial forces applied by the sealing element 84 and acting on the outer surface of the insulator of the insulated portion 74 requires a rigid insulator material. Flexible materials such as common insulator materials are not suited to provide a sealing surface because they are not configured to carry the radial force required to seal off downhole pressure of several 100 bars, up to 2000 bar and more.

Using a rigid material such as PEEK for the insulator 56 of the antenna wire 51 presents challenges due to the stiffness of the material. The antenna coil cannot be winded easily around the tool body 42 during the tool assembly in the workshop without damaging the rigid insulator material. The coil is thus formed during the manufacturing process of the antenna wire 51, or in a separate coil winding step. To place the readily winded antenna coil requires alternative assembly techniques that are described further down in this disclosure.

In an example, the exposed portion 76 is attached to an antenna wire contact element 90 (such as a connector box, or a female contact member) that electrically connects the exposed portion 76 to a transmission line 92. The exposed portion 76 may be soldered to the contact element 90. In an alternative embodiment, the exposed portion 76 establishes the electrical connection to the contact element 90 by making contact based on the force F acting on the antenna wire 51. All or part of the contact element 90 may be disposed in the cavity 86 and surrounded or encapsulated by the stop element 88 or by the clamping element 130. The transmission line 92 in turn connects to the electronics 70. The transmission line 92 may be attached to a male or female transmission line contact element (not shown) that connects to the antenna wire contact element 90. As shown, the electronics 70 may include an additional transmission line 94 to, e.g., connect to the second end 60 of the coil 52 utilizing another connection assembly similar to the connection assembly 80. The connection assembly on the other end 60 provides electrical connection between the second end 60 and the transmission line 94 of the electronics 70 in the isolated region 72.

Figure 4:
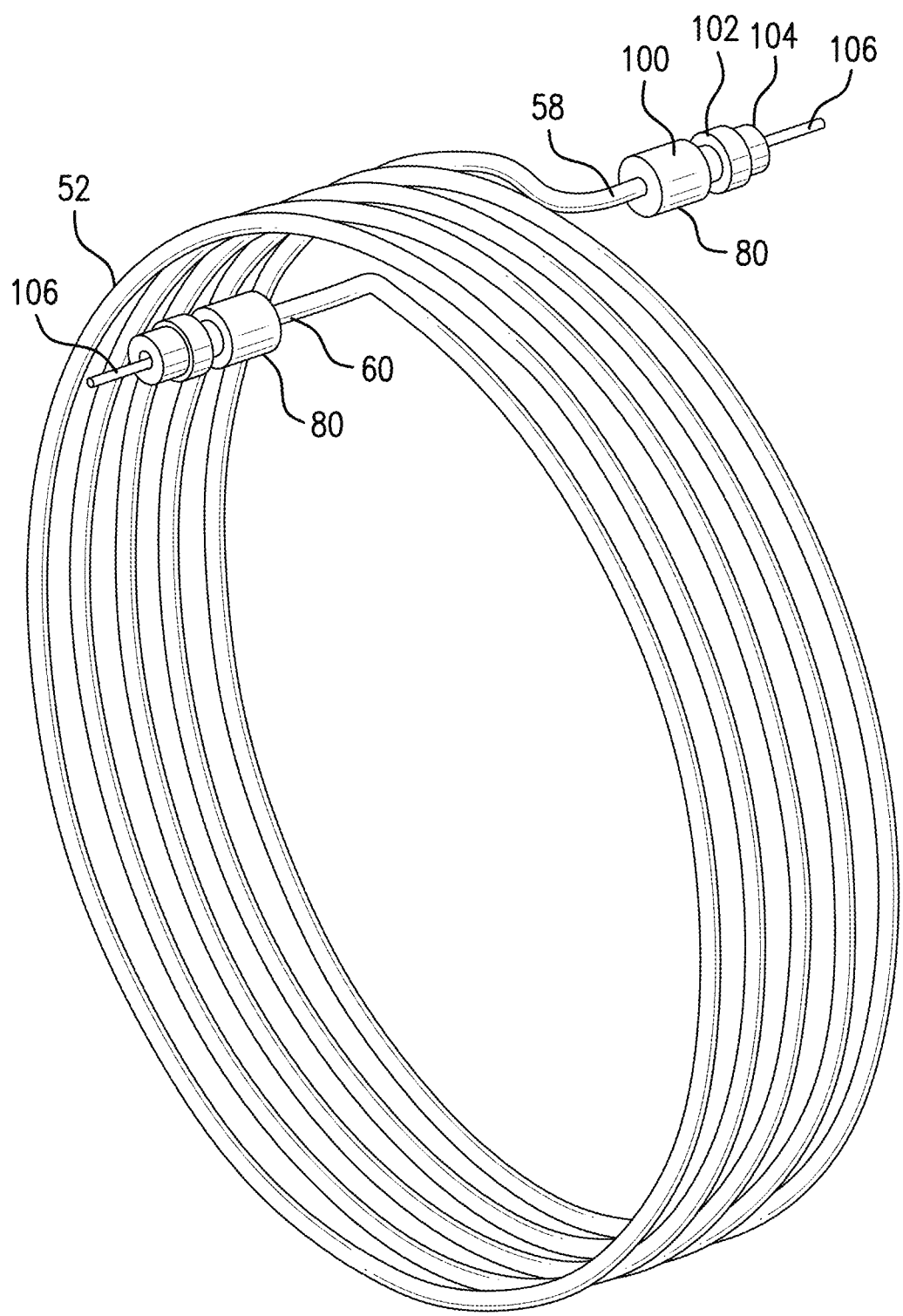
FIG. 4 depicts an embodiment of a connection assembly configured to be connected to the measurement apparatus of FIG. 2.

FIG. 4 depicts another embodiment of the connection assembly 80. Although FIG. 4 shows both the first end and the second end attached to a respective connection assembly 80, the apparatus 40 is not so limited, as there may be a connection assembly provided at only one end. In this embodiment, the connection assembly 80 includes an inner connector body 100 that is integral with the insulator 56. The body 100 may be made from the same insulating material as the insulator 56, and integrally formed by molding or casting the body with the insulator. The connector body 100 has an increased thickness of insulating material surrounding the conductor of the antenna wire 51 proximate the first and or second end of the coil 52. The connector body 100 has a sealing section 102 configured to seal against the support structure 78 or a connector housing, and an insulator support section 104 to support an axial end of the insulator.

A connection pin 106 may extend from the body 100, which may be an exposed portion of the conductor, or a separate element connected to the conductor, e.g., by welding. The inner connector body 100 extends into a connector housing (not shown). The connector housing is either integrally formed with a support structure (e.g., the tool body) or is connected to the support structure similarly to the embodiment of FIG. 3A. The connector housing includes a first stop element with a first stop element surface and a second stop element with a second stop element surface. The insulator support section 104 includes an insulator support surface (not shown). The insulator support surface contacts the first stop element surface. The first stop element surface supports at least a portion of a force F associated with the downhole fluid pressure acting on the antenna wire 51.

The connection pin 106 includes on its axial end a conductor support surface (not shown). The conductor support surface contacts the second stop element surface in the connector housing. The second stop element surface supports at least a portion of the force F. The first and second stop element surfaces are supported by the support structure. The conductor support surface and the second stop element support surface, and the insulator support surface and the first stop element surface each have a normal vector. The normal vector may be substantially parallel to the direction of the force F, and/or may be substantially parallel to the longitudinal axis of the antenna 51 at the location of the connector body 100. The normal vectors may form an angle between 0.1 to 10 degrees, 0.1 to 20 degrees, 0.1 to 45 degrees, or 0.1 to 60 degrees to the direction of the force F. The first and second stop element surfaces and the insulator and conductor support surfaces may each have a plane surface to ensure full contact of the support surfaces with each other. The normal vectors of the conductor support surface and the normal vector of the insulator support surface may be different. The sealing section 102 may include a sealing system similar to the sealing system described in FIG. 3A or 3B.

Embodiments described herein provide a number of benefits, advantages and technical effects. For example, the antenna 50 has sufficient rigidity to maintain the shape of the coil, but with sufficient flexibility and resilience so that the coil can be flexed in order to increase the diameter of the antenna 50, and released to return the antenna 50 to an initial diameter. This flexibility allows the antenna 50 to be easily removed and replaced. This is advantageous as compared to conventional antennas, which typically cannot be readily removed or replaces, as conventional antennas are typically adhered and held in place via epoxy or rubber. The flexibility of the antenna 50 is determined by the material properties of the insulator and the conductor.

In addition, the connection assemblies described herein are advantageous in that the connection assemblies can be connected to electronics without soldered connections to the wiring of the electronics, which are not easily removed. In order to preserve the isolation provided by an isolated region (housing electronics, for example), such soldered connections must be sealed. Typically, the soldered connections are sealed by rubber, using a rubber boot or overmolding. In addition to having problems related to removability, reliability problems can occur due to vibration and aging of the rubber. The connection assemblies described herein provide a solution to such problems by providing connections that provide reliable seals without requiring rubber boots or overmolding.

The antenna coil system as described here may have the ends of the antenna coil 52 electrically connected to electrical contact elements inside the connection assembly 80. The connection assemblies 80 are configured to be connected and disconnected easily to or from a tool without performing soldering steps (plug and play). The antenna coil 52 with the connections assemblies connected on both ends forms an antenna assembly. The antenna assembly can be replaced easily by a new antenna assembly during maintenance of the tool. The antenna assembly is equipped with a rigid insulator of the antenna wire that provides a sealing surface and allows including a fluid barrier inside the connection assemblies capable of sealing-off downhole fluid at high pressures. The antenna assembly may be manufactured to build a unit that is assembled to the tool body in one step. In an alternative embodiment, the connection assemblies are connected to the antenna coil 52 (e.g., by pushing onto the antenna wire 51) after placing the antenna coil 52 on the tool body. The connection assembly may be a straight connector, with the longitudinal axis of the connection assembly being parallel to the longitudinal axis of the insulated portion of the antenna wire. In an alternative embodiment, the connection assembly is an angular connector, such as a right-angle plug. The angular connector includes a longitudinal axis parallel to the longitudinal axis of the insulated portion 74 and an angled axis that forms an angle to the longitudinal axis of the insulated portion 74. The angled axis may be perpendicular to the longitudinal axis of the insulated portion. The angular connector may facilitate the assembly of the antenna assembly on the tool.

Figure 5:
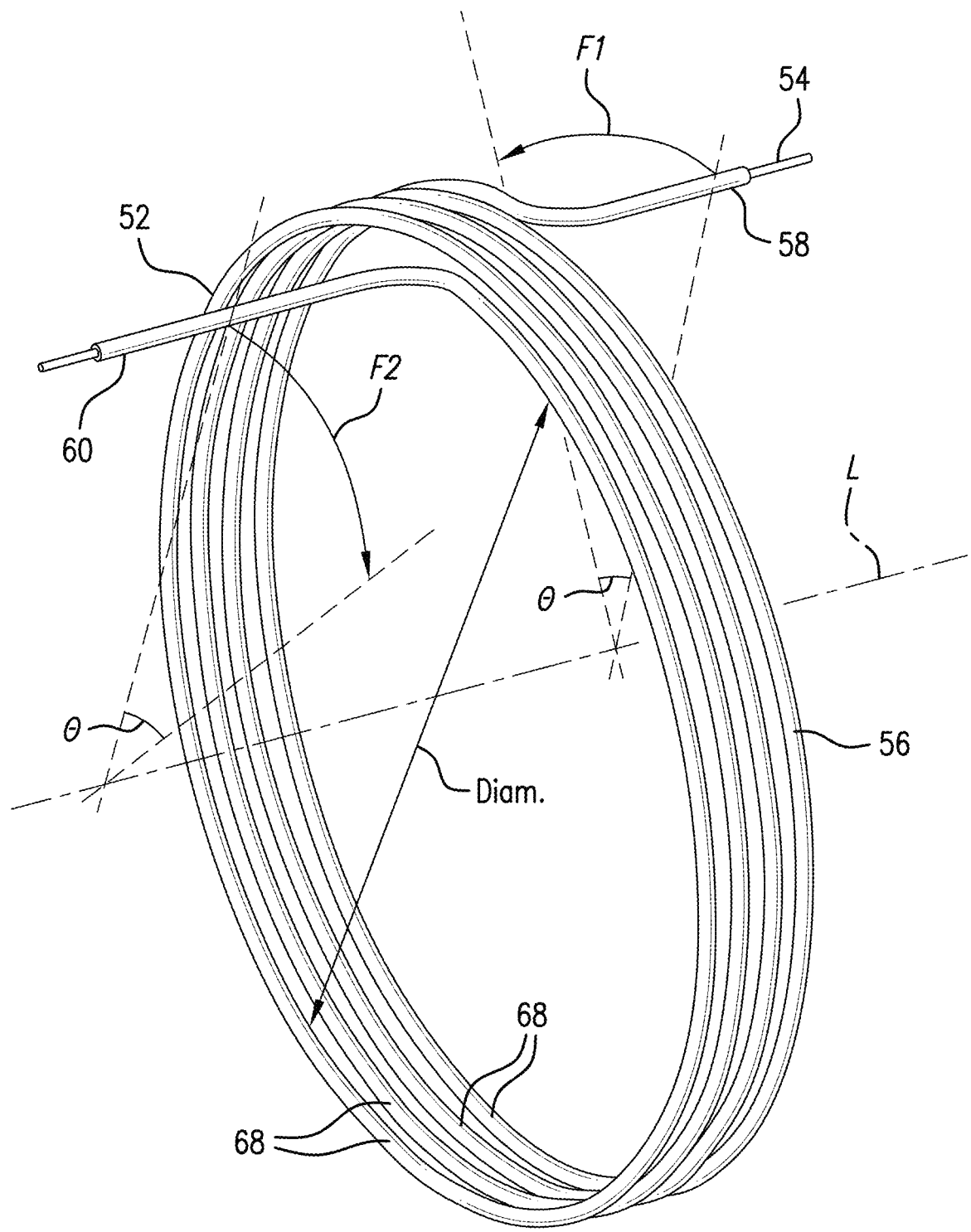
FIG. 5 depicts an example of forces applied to expand the antenna of FIG. 2.

The following is a description of an embodiment of a method of manufacturing or assembling the apparatus 40, and performing measurements of a subterranean region and/or borehole. Aspects of the method are discussed in conjunction with FIG. 5, which illustrates an embodiment of the antenna 50 and shows an example of forces applied to the antenna to facilitate assembly of the apparatus 40. FIG. 5 is provided for illustration purposes and is not intended to limit the method, as the method can be performed in conjunction with any type of tool, body or component, which may have any number of antennas in any desired configuration.

The method includes a plurality of steps or stages. All of the stages may be performed in the order described, but the method is not so limited. For example, one or more of the stages may be performed in a different order, or the method may include fewer than all of the stages.

At a first stage, the apparatus 40 is assembled by constructing the body 42 and incorporating components such as the ferrites 62. The antenna 50 is mounted on the body 42, and subsequently the mechanical shield or other protection is installed over the antenna.

The antenna 50 is mounted by expanding the antenna 50 to increase the antenna's diameter from an initial diameter to a larger diameter, and the expanded antenna 50 is disposed at the body 42 in the expanded state. For example, the expanded antenna is slid over the body 42, and subsequently released to return the antenna 50 to the initial diameter.

Alternatively, if the antenna 50 does not surround the body 42, but rather is mounted on the body 42 or surrounding a component or structure of the body, the antenna is expanded and mounted on the component or structure.

As shown in FIG. 5, during the mounting process, the ends 58 and 60 are pulled or pushed in opposing directions, i.e., against each other, by applying opposing forces to the first end and the second end respectively. The opposing forces are applied in opposing angular directions represented by arrows F1 and F2. For example, the first end 58 is moved along a first angular direction and the second end 60 is moved along an opposing second angular direction according to a defined angle θ. The angle θ may be between 1 to 25 degrees, 1 to 45 degrees, 1 to 65 degrees, 1 to 90 degrees, or 1 to 135 degrees without the insulator breaking.

In this way, the diameter of the windings 68 is increased, as the conductor exhibits the mechanics of a spring. The antenna 50 in the expanded state is then slid over or otherwise disposed around the body 42 to a final position, such as proximate to the ferrites, and the ends are connected to a control circuit or other device by connecting connection assemblies.

At a second stage, the apparatus 40 is deployed downhole as part of a downhole operation such as a drilling and/or measurement operation. For example, the measurement apparatus is incorporated in a LWD and/or bottomhole assembly.

At a third stage, electromagnetic measurements are performed by applying electromagnetic signals to a subterranean region via the antenna 50. For example, resistivity measurements are performed during drilling for estimating formation properties and/or for informing steering direction. Based on the measurements, operational parameters such as steering direction, weight-on-bit may be adjusted.

At a fourth stage, the apparatus 40 is retrieved at the surface. At this point, the antenna 50 may be removed by disconnecting the connection assemblies and again applying opposing forces to expand the antenna 50 and sliding the antenna 50 away from the body 42. The antenna may be removed, e.g., to replace the antenna 50 or disassemble the apparatus 40.

As noted above, the embodiments described herein are not limited to an expandable antenna that surrounds a body. The antenna 50 may be mounted at any suitable location on or in a body, for example on or around a support structure and/or mounted within a cavity or recess in the body.

Figure 6:
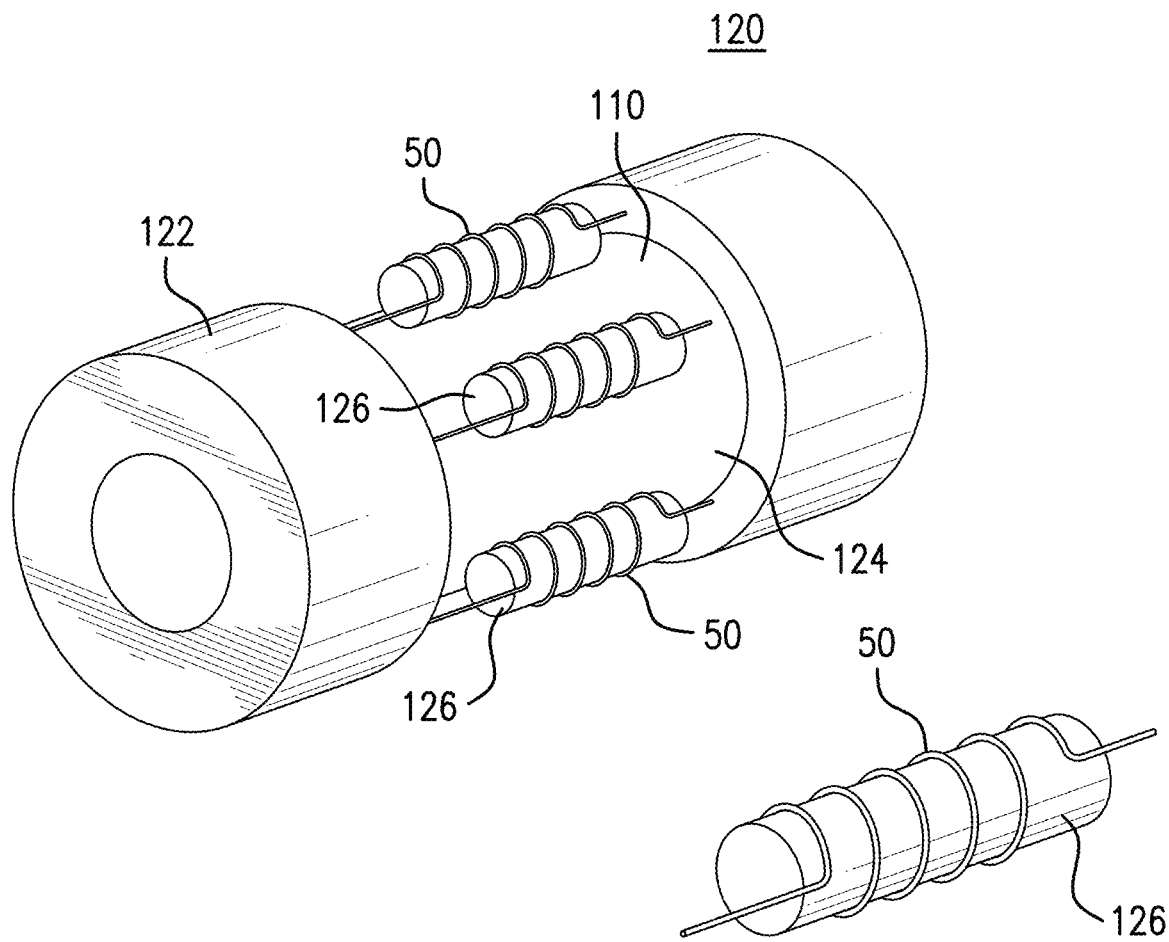
FIG. 6 depicts an embodiment of a downhole component or tool having one or more expandable antennas.

FIG. 6 depicts an example of aspects of a measurement apparatus 120 including one or more expandable antennas 50 fixedly disposed on a body 122. In this example, the body 122 is a drill string component having a recess 124 that accommodates components of an NMR measurement assembly.

A plurality of support structures 126 are fixedly disposed at or near a surface of the recess 110, and an antenna 50 is wrapped around each support structure 126. In this example, the body is configured to support components of an NMR measurement assembly, and the support structures 126 are ferrite modules. It is noted that this example is not limited to the specific configuration shown in FIG. 6, as the apparatus 120 may have any number (one or more) of antennas 50 and/or support structures 126, which may be disposed at any suitable location. In addition, the support structures 126 are not limited to ferrite modules and may be any structures that are mounted on or fixedly disposed at the body 122.

Set forth below are some embodiments of the foregoing disclosure:

Embodiment 1: A downhole electromagnetic device comprising: a tool body; an antenna wire placed on or at the tool body and winded to define at least one antenna loop, the antenna wire including: an electrical conductor, and an insulator having an outer surface, the insulator made from a non-conductive insulating material, the insulator configured to be exposed to a downhole fluid and insulate the electrical conductor from the downhole fluid, the downhole fluid having a downhole fluid pressure; an electrical connector connected to an end of the antenna wire, the electrical connector including: a longitudinal axis and an inner surface, a sealing element configured to seal the electrical connector from the downhole fluid, the sealing element contacting the inner surface of the electrical connector and the outer surface of the insulator, and a first support member configured to support a load applied on the electrical connector by the antenna wire; a cavity in the tool body having a cavity pressure, the cavity pressure being smaller than the downhole fluid pressure; and an electronic circuit disposed in the cavity; wherein the electrical connector provides electrical contact between the antenna wire and the electronic circuit, and the load applied on the electrical connector is caused by a differential pressure defined by the downhole fluid pressure and the cavity pressure.

Embodiment 2: The device of any prior embodiment, further comprising a second support member included in the electrical connector, wherein the first support member is configured to support a first portion of the load applied on the electrical connector by the insulator, and the second support member is configured to support a second portion of the load applied on the electrical connector by the electrical conductor.

Embodiment 3: The device of any prior embodiment, further comprising a first support surface on an axial end of the insulator, wherein the first support member of the electrical connector includes a second support surface, the first support surface contacting the second support surface, and a third support surface on an axial end of the electrical conductor, and the second support member includes a fourth support surface, the third support surface contacting the fourth support surface.

Embodiment 4: The device of any prior embodiment, wherein the first support member includes a clamping member, the clamping member clamping on the insulator of the antenna wire, the clamping member configured to support at least a portion of the load.

Embodiment 5: The device of any prior embodiment, wherein the electrical conductor and the insulator form an integral unit.

Embodiment 6: The device of any prior embodiment, wherein the non-conductive insulating material includes at least one of a plastic material and a ceramic material.

Embodiment 7: The device of any prior embodiment, wherein the non-conductive insulating material is PEEK.

Embodiment 8: The device of any prior embodiment, wherein the sealing element is made from an elastomer.

Embodiment 9: The device of any prior embodiment, wherein the sealing element is a spring energized seal, the spring energized seal including a spring member and a plurality of support rings, wherein at least one of the plurality of support rings are made from at least one of a plastic material and an elastomer.

Embodiment 10: The device of any prior embodiment, wherein the first support member includes a first support surface, the first support surface having a normal vector, the normal vector having an angle between 0 and 60 degrees to the longitudinal axis of the electrical connector, the first support surface contacting the insulator.

Embodiment 11: The device of any prior embodiment, wherein the insulator includes an outer diameter, the outer diameter of the insulator varying along the antenna wire, wherein the variation of the outer diameter of the insulator is configured to provide a second support surface, the second support surface contacting the first support surface.

Embodiment 12: The device of any prior embodiment, wherein the electrical conductor includes a first support surface, the first support surface having a normal vector, the normal vector having an angle between 0 and 60 degrees to the longitudinal axis of the electrical connector, the first support surface contacting the first support member.

Embodiment 13: The device of any prior embodiment, wherein the antenna wire is winded around the tool body to form a cylindrical coil including an inner diameter, the cylindrical coil is configured to increase the inner diameter by applying opposite forces to opposite ends of the antenna wire, and the increase in the inner diameter permits shifting the antenna wire along the tool body.

Embodiment 14: The device of any prior embodiment, wherein the electrical connector is an angular connector.

Embodiment 15: A method of connecting an antenna to an electronic circuit in a downhole tool, the method comprising: deploying a tool in a borehole, the tool including a tool body and an antenna wire placed on or at the tool body and winded to define at least one antenna loop, the antenna wire including an electrical conductor and an insulator having an outer surface, the insulator made from a non-conductive insulating material, the insulator configured to be exposed to a downhole fluid having a downhole fluid pressure and insulate the electrical conductor from the downhole fluid, and an electronic circuit disposed in a cavity in the tool body, the cavity having a cavity pressure, the cavity pressure being smaller than the downhole fluid pressure; connecting an electrical connector to an end of the antenna wire, the electrical connector including an inner surface and a first support member; sealing with a sealing element the electrical connector from the downhole fluid, the sealing element contacting the inner surface of the electrical connector and the outer surface of the insulator; and supporting with the first support member a load applied on the electrical connector by the antenna wire; wherein the electrical connector provides electrical contact between the antenna wire and the electronic circuit, and the load applied on the electrical connector is caused by a differential pressure defined by the downhole fluid pressure and the cavity pressure.

Embodiment 16: The method of any prior embodiment, wherein the electrical connector includes a second support member, the first support member is configured to support a first portion of the load applied on the electrical connector by the insulator, and the second support member is configured to support a second portion of the load applied on the electrical connector by the electrical conductor.

Embodiment 17: The method of any prior embodiment, wherein a first support surface is on an axial end of the insulator, the first support member of the electrical connector including a second support surface, the first support surface contacting the second support surface, and wherein a third support surface is on an axial end of the electrical conductor and the second support member includes a fourth support surface, the third support surface contacting the fourth support surface.

Embodiment 18: The method of any prior embodiment, wherein the first support member includes a clamping member, the clamping member clamping on the insulator of the antenna wire, the clamping member configured to support at least a portion of the load.

Embodiment 19: The method of any prior embodiment, wherein the antenna wire is winded around the tool body to form a cylindrical coil including an inner diameter, the cylindrical coil is configured to increase the inner diameter by applying opposite forces to opposite ends of the antenna wire, and the increase in the inner diameter permits shifting the antenna wire along the tool body.

Embodiment 20: A connection device for a downhole electromagnetic device, the connection device comprising: an electrical connector configured to be connected to an end of an antenna wire, the antenna wire placed on or at the tool body and winded to define at least one antenna loop, the antenna wire including an electrical conductor and an insulator having an outer surface, the insulator made from a non-conductive insulating material, the insulator configured to be exposed to a downhole fluid and insulate the electrical conductor from the downhole fluid, the downhole fluid having a downhole fluid pressure, the electrical connector including: a longitudinal axis and an inner surface, a sealing element configured to seal the electrical connector from the downhole fluid, the sealing element contacting the inner surface of the electrical connector and the outer surface of the insulator, and a first support member configured to support a load applied on the electrical connector by the antenna wire; and an electronic circuit disposed in a cavity in the tool body, the cavity having a cavity pressure, the cavity pressure being smaller than the downhole fluid pressure, wherein the electrical connector is configured to provide electrical contact between the antenna wire and the electronic circuit, and the load applied on the electrical connector is caused by a differential pressure defined by the downhole fluid pressure and the cavity pressure.

In connection with the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% or 5%, or 2% of a given value.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

What is claimed is:

1. A downhole electromagnetic device comprising:
   a tool body;
   an antenna wire placed on or at the tool body and winded to define at least one antenna loop, the antenna wire including:
     an electrical conductor, and
     an insulator having an outer surface, the insulator made from a non-conductive insulating material, the insulator configured to be exposed to a downhole fluid and insulate the electrical conductor from the downhole fluid, the downhole fluid having a downhole fluid pressure;
   an electrical connector connected to an end of the antenna wire, the electrical connector including:
     a longitudinal axis and an inner surface,
     a sealing element configured to seal the electrical connector from the downhole fluid, the sealing element contacting the inner surface of the electrical connector and the outer surface of the insulator, and
     a first support member configured to support a load applied on the electrical connector by the antenna wire;
   a cavity in the tool body having a cavity pressure, the cavity pressure being smaller than the downhole fluid pressure; and
   an electronic circuit disposed in the cavity;
   wherein the electrical connector provides electrical contact between the antenna wire and the electronic circuit, and the load applied on the electrical connector is caused by a differential pressure defined by the downhole fluid pressure and the cavity pressure.

2. The device of claim 1, further comprising a second support member included in the electrical connector, wherein the first support member is configured to support a first portion of the load applied on the electrical connector by the insulator, and the second support member is configured to support a second portion of the load applied on the electrical connector by the electrical conductor.

3. The device of claim 2, further comprising a first support surface on an axial end of the insulator, wherein the first support member of the electrical connector includes a second support surface, the first support surface contacting the second support surface, and a third support surface on an axial end of the electrical conductor, and the second support member includes a fourth support surface, the third support surface contacting the fourth support surface.

4. The device of claim 1, wherein the first support member includes a clamping member, the clamping member clamping on the insulator of the antenna wire, the clamping member configured to support at least a portion of the load.

5. The device of claim 1, wherein the electrical conductor and the insulator form an integral unit.

6. The device of claim 1, wherein the non-conductive insulating material includes at least one of a plastic material and a ceramic material.

7. The device of claim 1, wherein the non-conductive insulating material is PEEK.

8. The device of claim 1, wherein the sealing element is made from an elastomer.

9. The device of claim 1, wherein the sealing element is a spring energized seal, the spring energized seal including a spring member and a plurality of support rings, wherein at least one of the plurality of support rings are made from at least one of a plastic material and an elastomer.

10. The device of claim 1, wherein the first support member includes a first support surface, the first support surface having a normal vector, the normal vector having an angle between 0 and 60 degrees to the longitudinal axis of the electrical connector, the first support surface contacting the insulator.

11. The device of claim 10, wherein the insulator includes an outer diameter, the outer diameter of the insulator varying along the antenna wire, wherein the variation of the outer diameter of the insulator is configured to provide a second support surface, the second support surface contacting the first support surface.

12. The device of claim 1, wherein the electrical conductor includes a first support surface, the first support surface having a normal vector, the normal vector having an angle between 0 and 60 degrees to the longitudinal axis of the electrical connector, the first support surface contacting the first support member.

13. The device of claim 1, wherein the antenna wire is winded around the tool body to form a cylindrical coil including an inner diameter, the cylindrical coil is configured to increase the inner diameter by applying opposite forces to opposite ends of the antenna wire, and the increase in the inner diameter permits shifting the antenna wire along the tool body.

14. The device of claim 1, wherein the electrical connector is an angular connector.

15. A method of connecting an antenna to an electronic circuit in a downhole tool, the method comprising:
deploying the downhole tool in a borehole, the downhole tool including a tool body and an antenna wire placed on or at the tool body and winded to define at least one antenna loop, the antenna wire including an electrical conductor and an insulator having an outer surface, the insulator made from a non-conductive insulating material, the insulator configured to be exposed to a downhole fluid having a downhole fluid pressure and insulate the electrical conductor from the downhole fluid, and an electronic circuit disposed in a cavity in the tool body, the cavity having a cavity pressure, the cavity pressure being smaller than the downhole fluid pressure;
connecting an electrical connector to an end of the antenna wire, the electrical connector including an inner surface and a first support member;
sealing with a sealing element the electrical connector from the downhole fluid, the sealing element contacting the inner surface of the electrical connector and the outer surface of the insulator; and
supporting with the first support member a load applied on the electrical connector by the antenna wire;
wherein the electrical connector provides electrical contact between the antenna wire and the electronic circuit, and the load applied on the electrical connector is caused by a differential pressure defined by the downhole fluid pressure and the cavity pressure.

16. The method of claim 15, wherein the electrical connector includes a second support member, the first support member is configured to support a first portion of the load applied on the electrical connector by the insulator, and the second support member is configured to support a second portion of the load applied on the electrical connector by the electrical conductor.

17. The method of claim 16, wherein a first support surface is on an axial end of the insulator, the first support member of the electrical connector including a second support surface, the first support surface contacting the second support surface, and wherein a third support surface is on an axial end of the electrical conductor and the second support member includes a fourth support surface, the third support surface contacting the fourth support surface.

18. The method of claim 15, wherein the first support member includes a clamping member, the clamping member clamping on the insulator of the antenna wire, the clamping member configured to support at least a portion of the load.

19. The method of claim 15, wherein the antenna wire is winded around the tool body to form a cylindrical coil including an inner diameter, the cylindrical coil is configured to increase the inner diameter by applying opposite forces to opposite ends of the antenna wire, and the increase in the inner diameter permits shifting the antenna wire along the tool body.

20. A connection device for a downhole electromagnetic device, the connection device comprising:
an electrical connector configured to be connected to an end of an antenna wire, the antenna wire placed on or at a tool body and winded to define at least one antenna loop, the antenna wire including an electrical conductor and an insulator having an outer surface, the insulator made from a non-conductive insulating material, the insulator configured to be exposed to a downhole fluid and insulate the electrical conductor from the downhole fluid, the downhole fluid having a downhole fluid pressure, the electrical connector including:
a longitudinal axis and an inner surface,
a sealing element configured to seal the electrical connector from the downhole fluid, the sealing element contacting the inner surface of the electrical connector and the outer surface of the insulator, and
a first support member configured to support a load applied on the electrical connector by the antenna wire; and
an electronic circuit disposed in a cavity in the tool body, the cavity having a cavity pressure, the cavity pressure being smaller than the downhole fluid pressure, wherein the electrical connector is configured to provide electrical contact between the antenna wire and the electronic circuit, and the load applied on the electrical connector is caused by a differential pressure defined by the downhole fluid pressure and the cavity pressure.

* * * * *